United States Patent [19]

Flanhardt et al.

[11] Patent Number: 4,838,108
[45] Date of Patent: Jun. 13, 1989

[54] BEVEL GEAR ANGLE DRIVE

[75] Inventors: Michael Flanhardt, Cologne; Karl Coenen, Siegburg, both of Fed. Rep. of Germany

[73] Assignee: Jean Walterscheid GmbH, Fed. Rep. of Germany

[21] Appl. No.: 164,064

[22] Filed: Mar. 3, 1988

[30] Foreign Application Priority Data

Mar. 25, 1987 [DE] Fed. Rep. of Germany ....... 3709769

[51] Int. Cl.⁴ .......................... F16H 1/14; F16H 1/26
[52] U.S. Cl. ....................................... 74/417; 74/423; 74/665 GB
[58] Field of Search .................. 74/665 GB, 417, 423, 74/424

[56] References Cited

U.S. PATENT DOCUMENTS

| | | | |
|---|---|---|---|
| 590,616 | 9/1897 | House | 74/417 |
| 2,454,293 | 11/1948 | Waseige | 74/665 GB |
| 3,030,825 | 4/1962 | Diederich et al. | 74/423 |
| 3,503,274 | 3/1970 | Howard | 74/417 |
| 3,580,350 | 5/1971 | Arkus-Duntov | 74/665 GB |
| 3,863,450 | 2/1975 | Hause | 60/487 |
| 4,472,990 | 9/1984 | Seragnoli et al. | 51/247 |
| 4,723,464 | 2/1988 | Welschof et al. | 74/713 |

FOREIGN PATENT DOCUMENTS

| | | | |
|---|---|---|---|
| 135156 | 3/1985 | European Pat. Off. | 74/417 |
| 449033 | 6/1971 | Fed. Rep. of Germany | 74/424 |
| 3018148 | 11/1981 | Fed. Rep. of Germany | |
| 2319055 | 2/1977 | France | |
| 359619 | 2/1962 | Switzerland | 74/423 |
| 83219 | 5/1981 | U.S.S.R. | |
| 2165921 | 7/1985 | United Kingdom | |

OTHER PUBLICATIONS

Hurth: Getriebe fur Schienenfahrzeuge, Carl Hurth Maschinenund Zahnradfabrik Holzstr. 19, 8000 München 5 (pp. 1-18).

Uni Cardan Gleichlaufgelenke fur die Moderne Antriebstechnik im Automobilbau, Uni-Cardan AG, Postfach 89, 5200 Siegburg (pp. 1-16).

OchobbI Kohctpynpobahnr KHNra 1 and KHNra 2 (4 pages).

Primary Examiner—Allan D. Herrmann
Attorney, Agent, or Firm—Toren, McGeady & Associates

[57] ABSTRACT

A bevel gear angle drive suitable for use in the drive line from an agricultural tractor to an agricultural implement comprises a housing 24 with input and output shafts at right angles having respective bevel gears 36 and 38 engaged with one another within the housing. The output shaft comprises a journal 40 to which is secured the outer joint part 44 of a constant velocity ratio universal joint; the journal being supported for rotation in bearings 46 at one side of the housing and the outer joint part being supported in bearings 48 at the other side of the housing. The output shaft bevel gear 38 is mounted on the journal 40 intermediate the axially separated bearings 46 and 48.

6 Claims, 3 Drawing Sheets

BEVEL GEAR ANGLE DRIVE

BACKGROUND TO THE INVENTION

1. Field of the Invention

This invention relates to a bevel gear angle drive particularly, but not exclusively, suitable for use with agricultural implements driven from the power take off shaft of an agricultural tractor.

In certain types of agricultural implement, the working elements of the implement are arranged at an angle, e.g. a right angle, to the direction of travel of the implement. The working elements frequently have to be arranged so as to be adjusted laterally and vertically of the implement; such lateral adjustment serving to modify the working width of the implement.

Such implements are frequently provided as relatively light weight frame structures having mounting brackets thereon for attaching drives. Such frame structures can become distorted in use whereby said mounting brackets may become displaced from their optimum positions and, in any event, the locations of the mounting brackets may not always suit the configurations and orientations of the drives to the working elements of the implement. In use therefore undesirable loads may be imparted to the drives leading to unacceptable wear rates and the risk of premature failure.

Bevel gear angle drives having input and output shafts on intersecting axes of rotation are known, especially in general engineering applications, whereby a relatively compact design of drive line can be achieved.

SUMMARY OF THE INVENTION

It is an object of the present invention to provide a bevel gear angle drive which is especially suitable for use in a drive line to the working elements of an agricultural implement which will permit a rotary input to be diverted to a rotary output at an angle to the input and which will accommodate distortions in relatively fixed positions of the drive line without adversely affecting the drive.

In accordance with the invention there is provided a bevel gear angle drive comprising a drive housing; input and output shafts supported in said housing; a bevel gear mounted on each of said shafts within said housing, said bevel gears being inter-engaged with one another; one of said shafts comprising a journal connected for torque transmission to an outer joint part of a constant velocity ratio universal joint, said universal joint having an inner joint part disposed relative to said outer joint part to permit relative angular movement between said parts; first bearing means in said housing rotatably supporting said journal; second bearing means in said housing spaced axially of said journal from said first bearing means and rotatably supporting said outer joint part; said bevel gear on said one shaft being disposed on said journal between said first and second bearing means.

An advantage of such a bevel gear angle drive is in the compact design thereof which is achievable whilst permitting articulation between the input and output shafts to accommodate possible displacements in parts of the drive line relative to the angle drive. In particular, such possible displacements are found in the drive lines of agricultural implements. The design of angle drive according to the invention eliminates the requirement of further connecting elements between the joint and the journal because the journal is in fixed driving connection with the outer joint part. If the angle drive is arranged to follow the main drive line to the working elements of an agricultural implement there is the further advantage that, overall, the installation length of the drive line is increased resulting in a decrease in the degree of articulation between the angle drive input and output shafts during use of the implement.

The said journal may include two locations spaced axially apart thereof for selective disposal thereon of said bevel gear in torque transmitting connection with said journal and, conveniently, each of said two locations comprises a set of teeth extending radially outwardly of said journal, said bevel gear including a set of cooperating teeth at a central bore thereof engaged with a said set of teeth at one of said locations providing a said torque transmitting connection of said bevel gear with said journal.

Said second bearing means conveniently comprises a plurality of rolling elements disposed between an annular radially outer bearing race associated with said housing and a radially inner bearing race provided by a circumferential outer surface of said outer joint part.

Said first and second bearing means may comprise thrust bearings capable of accommodating the axial forces resulting from the bevel gears during transmission of torque.

The inner joint part may be disposed relative to said outer joint part to permit only of angular relative movement between said joint parts or, alternatively, it may be disposed to permit of angular and axial relative movement between said joint parts.

Conveniently, there is provided a boot seal of convoluted configuration arranged between said inner joint part and an adjacent part of said housing through which said inner joint part projects and, preferably, said boot seal is arranged relative to said housing to remain stationary during rotation of said inner joint part.

BRIEF DESCRIPTION OF DRAWINGS

Other features of the invention will become apparent from the following description given herein solely by way of example with reference to the accompanying drawings wherein.

DESCRIPTION OF PREFERRED EMBODIMENTS

Figure 1:
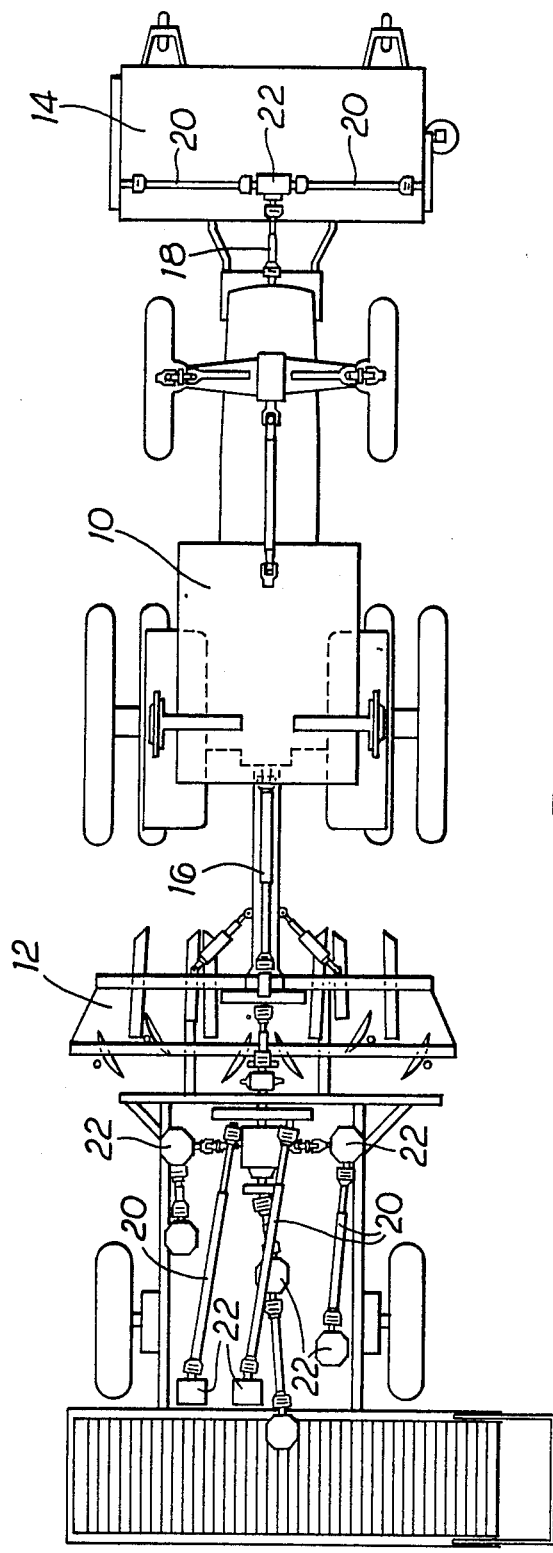
FIG. 1 is a diagrammatic top plan view of an agricultural tractor and agricultural implements powered by drive lines including bevel gear angle drives in accordance with the invention.

Referring to FIG. 1, there is shown an agricultural tractor 10 having a rear agricultural implement 12 and a front agricultural implement 14 each of which is driven by respective main drive shafts 16 and 18 from the tractor. The working elements of each of the implements 12 and 14 are driven by a number of subsidiary drive shafts 20 receiving power from the respective main drive shafts 16 and 18. On the implements, there are shown bevel gear angle drives 22 each constructed in accordance with the invention to distribute a rotary power output to the working elements.

Embodiments of bevel gear angle drives suitable for use in the configuration of FIG. 1 will now be described with reference to FIGS. 2 and 3.

Figure 2:
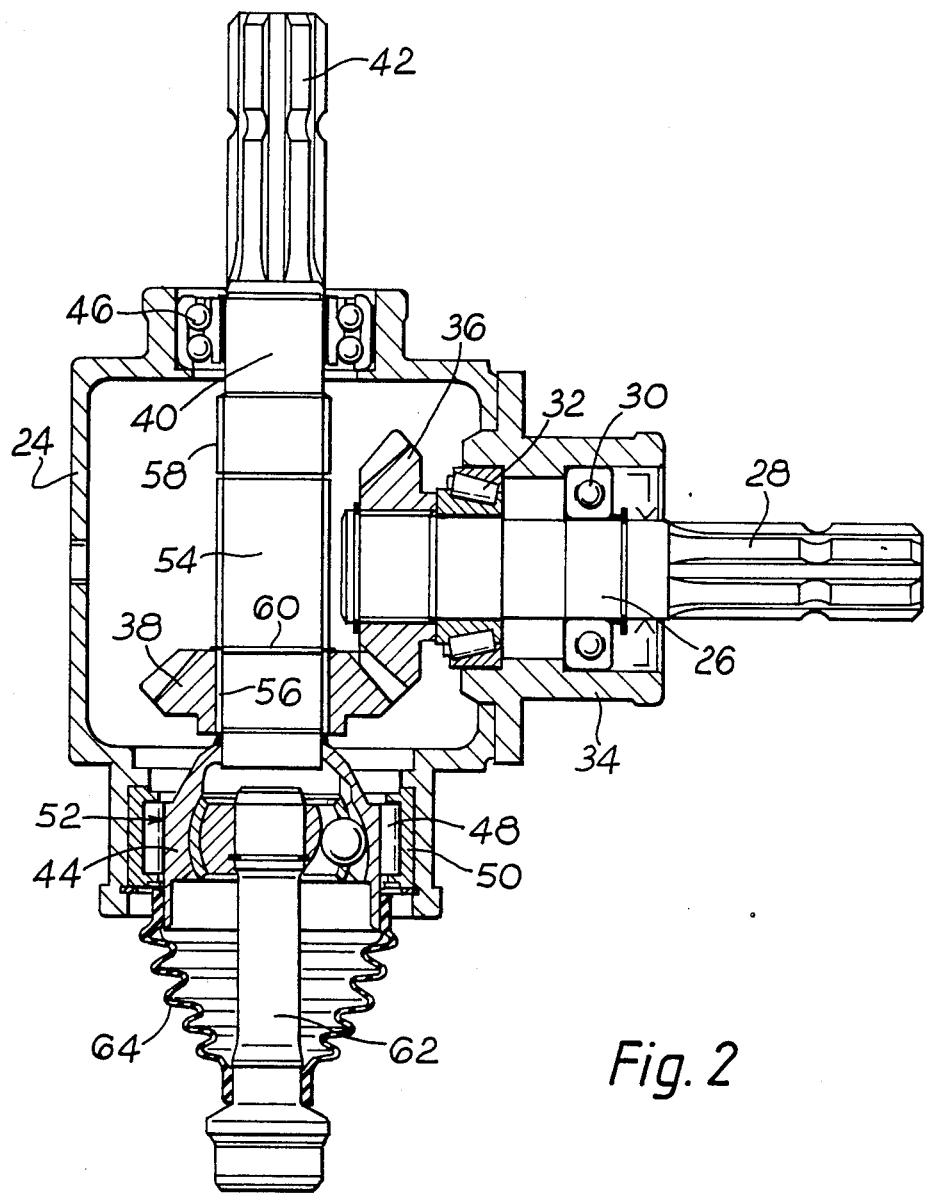
FIG. 2 is a cross sectional view through a bevel gear angle drive of the invention in a plane containing the axes of rotation of the input and output shafts.

In FIG. 2, the bevel gear angle drive comprises a housing 24 wherein an input shaft comprising a journal 26 having a splined input end 28 is rotatably mounted in axially spaced ball bearings 30 and roller bearings 32 in a housing extension 34 to project into the interior of the housing 24. A bevel gear 36 is fixedly secured, as by a splined connection, to the inboard end of the journal 26 within the housing 24 for engagement with a cooperating bevel gear 38 on an output shaft whose axis of rotation is at right angles to that of the input shaft.

The output shaft comprises a journal 40 having a splined output end 42 projecting outwardly of the housing 24 and having its other end secured in torque transmitting relationship, as for example by welding, to the outer joint part 44 of a constant velocity ratio universal joint. The journal 40 is supported in the housing 24 by axially spaced bearings comprising a set of roller bearings 46 at the output end 42 of the journal and a set of roller bearings 48 supporting the outer joint part 44. Said roller bearings 48 are provided in a radially outer bearing race 50 secured to part of the housing and a radially inner bearing race provided by a circumferential outer surface 52 of the outer joint part 44 whereby the compactness of the angle drive is further enhanced.

An intermediate part 54 of the journal 40 is splined at two locations 56 and 58 and the bevel gear 38 thereon is provided with an interior bore having cooperating teeth whereby it may be selectively positioned, either at the location 56 shown in the drawing, or at the other location 58 at the other side of the bevel gear 36, whereby the direction of output rotation can be reversed. One or more suitable securing rings 60 are provided to hold the bevel gear 38 in its torque transmitting position at its location 56 or 58 on the journal 40.

The constant velocity ratio universal joint includes an inner joint part 62 projecting outwardly of the housing 24 and is arranged for angular movement relative to the outer joint part 44 in known manner through the intermediary of a cage and ball bearings. A convoluted boot seal 64 is arranged for rotation with the outer joint part 44 and, at its outer end, is arranged to engage a neck formed in the inner joint part.

All of the bearings 30, 32, 46 and 48 are conveniently designed as thrust bearings for accommodating the axial forces imparted to the respective shafts by virtue of the bevel gear drive engagement.

Figure 3:
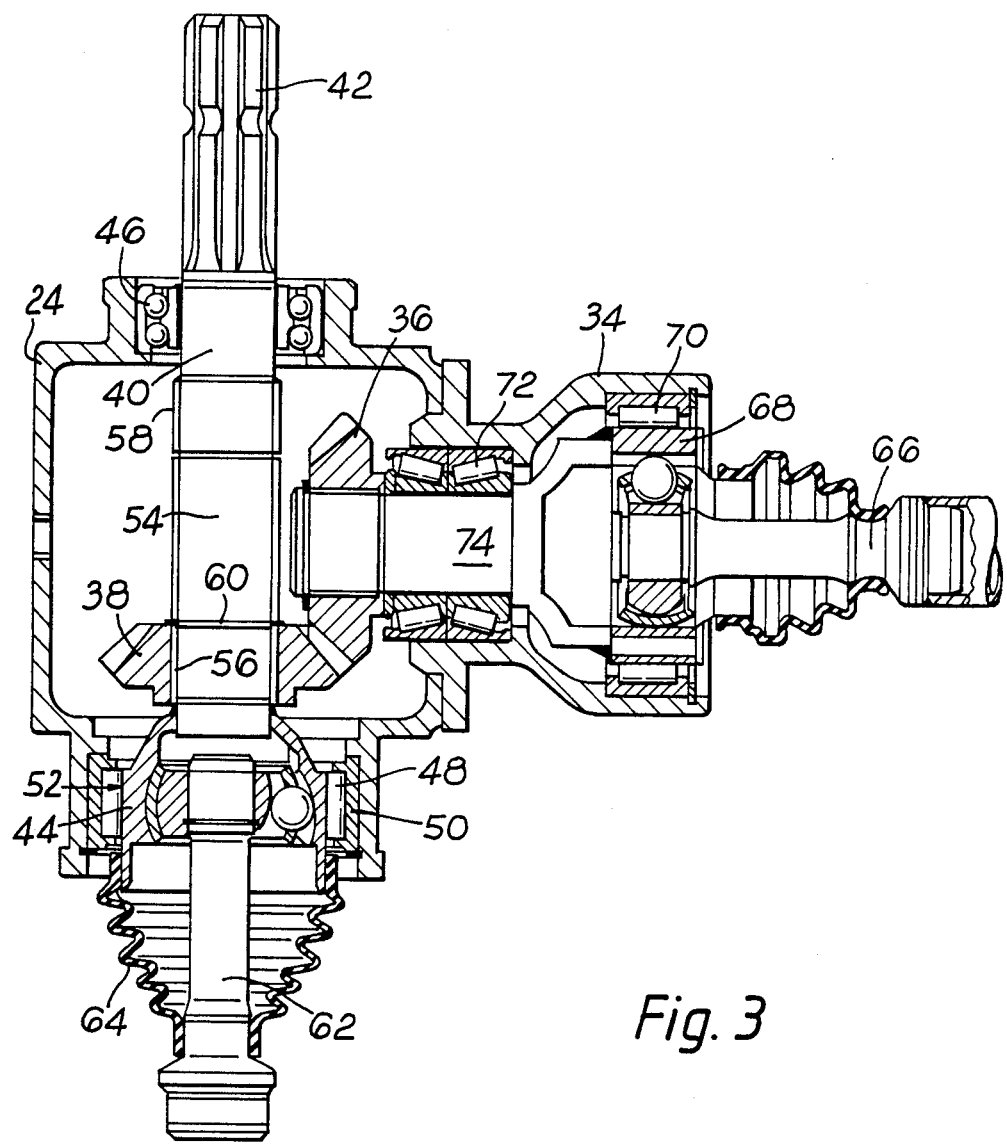
FIG. 3 is a view similar to that of FIG. 2 showing an alternative embodiment of bevel gear angle drive.

An alternative embodiment of bevel gear angle drive is shown in FIG. 3 wherein like reference numerals refer to like parts already described with reference to FIG. 2. In FIG. 3, it will be seen that the output shaft is the same as that illustrated in FIG. 2 but that the input shaft comprises the inner joint part 66 of a further constant velocity ratio universal joint having an outer joint part 68 supported for rotation in the housing extension 34 by axially spaced roller bearings 70 and 72, one set 70 of which support the outer joint part itself and the other set 72 of which support a journal 74 extending into the housing 24 from the outer joint part 68 and carrying the bevel gear 36 thereon. In this embodiment, the input shaft universal joint is designed to accommodate both angular and axial relative movement between the inner joint part 66 and the outer joint part 68.

In all of the embodiments hereinbefore described the inner joint part 62 of the output shaft universal joint may be arranged either only for angular relative movement relative to the outer joint part 44 or for both angular and axial movement relative thereto thereby permitting the take-up of any excess installation tolerances.

Thus, in accordance with the invention, the bevel gear angle drive provides a compact construction wherein the inter-engaging bevel gears are disposed within the housing and one of the shafts, described and illustrated as the output shaft in the specified embodiments herein, is supported in the housing by bearings spaced axially of the shaft and between which the bevel gear is located on the shaft.

We claim:

1. A bevel gear angle drive comprising a drive housing; input and output shafts supported in said housing; a bevel gear mounted on each of said shafts within said housing, said bevel gears being interengaged with one another; one of said shafts comprising a journal connected for torque transmission to an outer joint part of a constant velocity ratio universal joint, said universal joint having an inner joint part disposed relative to said outer joint part to permit relative angular movement between said parts; first bearing means in said housing rotatably supporting said journal; second bearing means in said housing spaced axially of said journal from said first bearing means and rotatably supporting said outer joint part; said bevel gear on said one shaft being disposed on said journal between said first and second bearing means, said journal includes two locations spaced axially apart of said journal for selective disposal thereon of said bevel gear in torque transmitting connection with said journal, each of said two locations comprises a set of teeth extending radially outwardly of said journal, and said bevel gear including a set of cooperating teeth at a central bore thereof engaged with a said set of teeth at one of said locations providing a said torque transmitting connection of said bevel gear with said journal.

2. A bevel gear angle drive as claimed in claim 1 wherein said second bearing means comprises a plurality of rolling elements disposed between an annular radially outer bearing race associated with said housing and a radially inner bearing race provided by a circumferential outer surface of said outer joint part.

3. A bevel gear angle drive as claimed in claim 1 wherein said first and second bearing means comprise thrust bearings.

4. A bevel gear angle drive as claimed in claim 1 wherein said inner joint part is disposed relative to said outer joint part to permit only of angular relative movement between said joint parts.

5. A bevel gear angle drive as claimed in claim 1 wherein said inner joint part is disposed relative to said outer joint part to permit of angular and axial relative movement between said joint parts.

6. A bevel gear angle drive as claimed in claim 1 including a boot seal of convoluted configuration arranged between said inner joint part and an adjacent part of said housing through which said inner joint part projects.

* * * * *